United States Patent [19]
Gilchrist et al.

[11] Patent Number: 5,745,695
[45] Date of Patent: Apr. 28, 1998

[54] RADIO SYSTEM WITH SUSPENSION OF PACKET DATA SERVICE DURING NON-DATA SERVICE CONNECTION

[75] Inventors: Philip Gilchrist, Bonn, Germany; Hans Petter Naper, Oslo, Norway

[73] Assignee: Motorola Inc., Schaumburg, Ill.

[21] Appl. No.: 587,073

[22] Filed: Jan. 16, 1996

[51] Int. Cl.$^6$ .................................................. G06F 13/00
[52] U.S. Cl. ........................... 395/200.57; 340/825.44; 370/330
[58] Field of Search .......................... 395/200.3, 200.55, 395/200.47, 200.57, 200.58, 200.59; 370/325, 348, 443, 458, 915, 330; 379/97, 98, 93; 340/825.44

[56] References Cited

U.S. PATENT DOCUMENTS

| | | | |
|---|---|---|---|
| 4,995,074 | 2/1991 | Goldman et al. | 379/97 |
| 5,287,401 | 2/1994 | Lin | 379/98 |
| 5,369,700 | 11/1994 | Koura et al. | 379/387 |
| 5,425,101 | 6/1995 | Woo et al. | 380/23 |
| 5,519,767 | 5/1996 | O'Horo et al. | 379/67 |
| 5,546,382 | 8/1996 | Fujino | 379/58 |
| 5,625,775 | 4/1997 | Davis et al. | 395/200.12 |

*Primary Examiner*—Parshotam S. Lall
*Assistant Examiner*—Viet Vu
*Attorney, Agent, or Firm*—J. Ray Wood

[57] ABSTRACT

A method of operation of a radio system with data capability, for example a GSM cellular radio system with GPRS capability includes suspending data service while remaining logged on to the system and signalling from a remote station (10) to a serving data service support node (13) via a base station subsystem (11) that data service is suspended. In another aspect, data is exchanged over a data channel (100) during first time periods (102) and exchange of data over the data channel stops during second time periods (103) intermittent between the first time periods. During the second time periods paging requests communicated on a paging channel (101) are monitored at the remote station (10). A non-data service paging request is identified on the paging channel and the system responds to the non-data service paging request.

15 Claims, 2 Drawing Sheets

# RADIO SYSTEM WITH SUSPENSION OF PACKET DATA SERVICE DURING NON-DATA SERVICE CONNECTION

FIELD OF THE INVENTION

This invention relates to a radio system with data capability, including without limitation a GSM cellular radio system with GPRS capability.

BACKGROUND OF THE INVENTION

In the Global System for Mobile Communications (GSM) Packet Radio System (GPRS), packet data is communicated between a remote station (hereafter referred to as a mobile station or MS) and a base transmitting station (BTS). In the architectural model a mobile station is comprised of either: a mobile terminating (MT) device only (i.e. a stand-alone device); a mobile termination connected to a terminal equipment or a mobile termination connected through a terminal adapter to a terminal equipment. In all three cases the expression "mobile termination" is used to refer to a message, series of packets or a connection transmitted from the system or a network connected to the system and received at a MS as a final destination. The expression "mobile originated" is used to refer to packets or connections originating from the MS.

Three classes of GPRS mobile stations are contemplated: Classes A, B, and C. These classes reflect certain capabilities that a customer accepts through the purchase of the equipment.

GSM as a unified standard must ensure that GPRS interacts with the existing voice, paging and other services in a predictable manner, whatever type of mobile the subscriber purchases. Because of their nature, Classes B and C MSs give rise to unique service integration problems.

While logged on to GPRS a subscriber using a class B MS must be able to receive paging requests with the same probability as if it were only operating idle mode procedures. Upon reception of a paging requests, the class B MS may interrupt the operation of GPRS and suspend the service. The subscriber is not logged off from GPRS. while GPRS is suspended, the MS may serve the request initiated by a page (e.g. speech-call). After the interrupt has been processed, GPRS is resumed.

A subscriber using a class C MS who is logged on to GPRS cannot be interrupted. It is not required that non-GPRS paging requests are reliably received.

Glossary of Terms

BSC Base Station Controller
BSS Base Station Subsystem
BSSMAP Base Station Subsystem Management Part (a protocol used to manage the base station subsystem)
BTS Base Transmitting Station
CCCH Call Control Channel
DCH Data Channel
DRX Discontinuous Reception
GPRS GSM Packet Radio Service—A cellular radio system supporting packet data messaging.
GSM Global System for Mobile communications
IMSI International Mobile Subscriber Identity
MAC Medium Access Control
MM Mobility Management
MO Mobile Originating
MS Mobile Station
MSC Mobile Switching Center
MT Mobile Terminating
Non-GPRS service operation tele and bearer services other than GPRS, e.g. a speech call
Non-service-specific operation signalling functions that exist regardless of the service(s) to which a subscriber has subscribed, e.g. a location update
NSS Network and Switching Subsystem
PCH Paging Channel
PD Protocol Discriminator
phase 1 The initial GSM specification
phase 2 Additional services provided beyond phase 1
PLMN Public Land Mobile Network
RR Radio Resource
SDCCH Standalone Dedicated Control Channel
SGSN Serving GPRS Support Node—The GPRS Support Node which is currently controlling access to the MS
SMCP Short Message Control Protocol
SS#7 Signalling System number 7
VLR Visitor Location Register

DETAILED DESCRIPTION OF THE PREFERRED EMBODIMENTS

Due to the current transmission capabilities of most MSs, it will not be possible to operate GPRS with most other GSM services in parallel, e.g. GPRS and speech services. If GPRS has been invoked and the user wishes to originate or terminate another service, GPRS may be temporarily interrupted (suspended). During temporary interruption, GPRS cannot be used to transfer data or carry out GPRS specific signalling procedures.

A subscriber using a class B MS enters a suspend state when the subscriber is logged on to a GSM radio system with GPRS data capability and has established GPRS data service and wishes to leave GPRS temporarily and initiate a mobile originated (MO) non-GPRS service or non-service specific operation.

A GPRS context, established during logon in the SGSN and MS, may be suspended. During suspension, GPRS cannot be used to transfer data or carry out GPRS specific signalling procedures. The subscriber is not logged off from GPRS. While in this state, arriving data is either buffered or discarded or flow control is initiated, depending on the characteristics of the external interworking protocols. Upon the resumption of GPRS, data transfer and GPRS specific system signalling procedures are continued as before suspension.

In accordance with the present invention, the MS communicates this information to the SGSN.

The MS signals to the SGSN that it is initiating a non-GPRS service or non-service-specific operation. The MS and SGSN suspend the GPRS context. The MS then initiates the non-GPRS operation.

This feature has the advantage of allowing the SGSN to obtain knowledge of the new suspended state.

Figure 1:
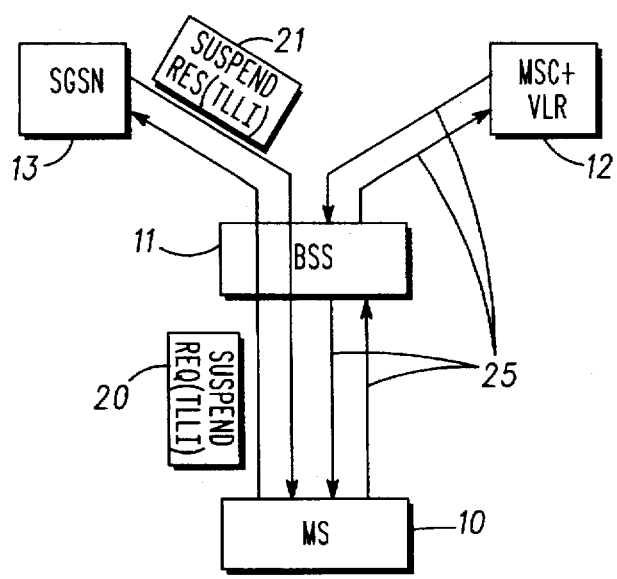
FIG. 1 and FIG. 2 are block diagrams of various elements of a GSM and GPRS system operating in accordance with a first aspect of the invention with MO GPRS functions.
Figure 2:
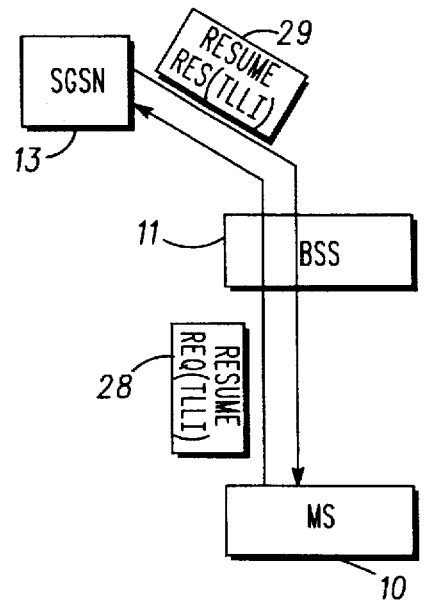

FIGS. 1 and 2 illustrate details of the arrangement.

FIG. 1 shows a remote station 10, which can be fixed or mobile but will be referred to as MS 10, in communication with a BSS 11, in turn connected to a GSM MSC 12 (with an associated VLR) and also connected to a GPRS data service support node 13 (i.e. a SGSN 13).

The MS is aware that a mobile originated (MO) service or non-service invocation is pending. The MS sends a suspend message 20 to the SGSN and the SGSN responds (message 21). The MS's context is then suspended in the MS and SGSN.

It should be noted that based on the type of MO operation, non-service signalling or a speech call, it can be indicated to the SGSN if the suspension period is expected to be for seconds or minutes. The SGSN may take different actions in either case.

The MS initiates the non-GPRS service or non-service-specific operation.

When the MS has finished the MO non-GPRS service operation, the MS sends a resume message to the SGSN and the SGSN responds.

Thus there has been described in a radio system with data capability comprising a remote station 10, a base station subsystem 11 and a serving data service support node 13, a method of operation comprising the steps of: logging on to the system; establishing data service; suspending data service while remaining logged on to the system; and signalling from the remote station to the serving data service support node via the base station subsystem that data service is suspended.

It has been described that the method preferably includes the step of acknowledging from the serving data service support node to the remote station that data service is suspended and it has been described that the step of signalling from the remote station to the serving data service support node preferably comprises signalling an estimation of an expected period of duration of data service suspension.

The method preferably further comprises the steps of: initiating one of non-data-service operation and non-service-specific operation; sending a resume message from the remote station to the serving data support node and sending a response from the serving data support node to the remote station.

The method described above has the advantage that no MSC/VCR modifications are necessary.

Alternative ways of the SGSN obtaining knowledge of the new suspended state are as follows.

Let the SGSN deduce it. The transmission success-rate will be 0% of all packets. After a period of time, the SGSN assumes that the MS is suspended. The SGSN attempts to resume GPRS after some period by "pinging" the MS. If this fails, the user is logged off from GPRS. This method is less preferred.

Let the MS set up a non-GPRS service or non-service specific operation through the MSC/VLR, and then have the MSC/VLR signal this to the SGSN. Both the SGSN and MS would be in the suspended state. After the non-GPRS operation is completed, the MSC/VLR signals to the SGSN to resume GPRS. The MS derives this information locally.

To implement this method at least one new field is defined in the VLR indicating that the subscriber is a class B MS currently engaged in a GPRS session. Initialization functions initialize these data fields and maintain their status. Mobile tracking functions in the MSC/VLR perform SGSN mobile tracking in order that the information can be sent to the correct SGSN. Real-time data compatibility is synchronized between distributed databases at the MS, MSC/VLR and SGSN.

This is also a less preferred solution.

When a class C MS which was in idle mode wishes to enter GPRS, the MS may wish to indicate to the PLMN that it will be unavailable for non-GPRS services. It is proposed that this is signaled through the use of the existing supplementary services functions. Before executing the GPRS LOGON functionality, the MS may activate "Bar all incoming calls" or may activate "Call forwarding unconditional". Alternatively "User defined user busy" functionality is adapted from the call forwarding functionality.

After the user returns from GPRS, the MS deactivates the supplementary service, enabling the MS to reliably operate non-GPRS services. This is hidden from the subscriber and does not require subscriber interaction other than initial configuration settings (e.g. input of a forwarding number).

Referring now to mobile terminating (MT) functions in a class B MS, some key questions arise such as how can a class B MS receive a non-GPRS paging request while logged onto GPRS? Once a paging request has been captured, how does an MS respond? How do the "response to paging" functionality and GPRS interact with one another?

In the mobile terminating case, regardless of how a non GPRS PAGING REQUEST is captured, the functionality described above may also be used if the paging timers in the network are greater than the length of time it takes the MS to indicate to the SGSN that it is suspending GPRS plus the time it takes to respond to the request.

The MS receives a page from the MSC 12 indicating a request to set up a non-GPRS service or non-service-specific operation and the MS signals to the SGSN that it is initiating the non-GPRS service or non-service-specific operation; the MS and SGSN suspend the GPRS context. The GPRS functions of the SGSN and MS are suspended. The MS then initiates the non-GPRS operation and there is sufficient time for the MS to respond to the page before the paging timers in the MSC 12 (or the GSM network connected to the MSC 12) to time out and cause the MSC (or the network) to resend the page.

If the paging timers in the network are shorter than the length of time it takes the MS to indicate to the SGSN that it is suspending GPRS plus the time it takes to respond to the request, a greater problem exists, as the MSC (or the network) will reissue the page, thereby unnecessarily loading the GSM paging channel.

According to the second aspect of the invention an arrangement is provided which does not involve network functionality at all and is based on the synchronization of GPRS data traffic across the radio interface and the periodic occurrence of a user's paging sub-group.

There are three paging modes: normal mode, in which there is a PCH for each cell and the PCH is divided into several (e.g. four) sub-channels and each MS is pre-assigned to one of the paging sub-channels based on the last two (or more) digits of its unique IMSI; full mode, in which all MSs listen to all paging sub-channels; and next-but-one paging mode which is not presently used but allows for listening to the pre-assigned paging sub-group and in addition the next following paging sub-group. The solution described here is primarily applicable to normal mode but is not limited to that mode.

According to the present solution, the paging sub-group for GPRS service is calculated from the IMSI in the same way as for GSM, but with an offset (e.g. from 1 to 3) added. This means that the data (or GPRS) groups and the voice (or non-GPRS) groups are mutually exclusive and it means that the data paging sub-channel slots and the GSM paging sub-channel slots do not co-incide in time.

Thus, in idle mode, the MS can listen alternatively to the GSM CCCH which carries the PCH and to the GPRS DCH/PCH.

When there is an ongoing GPRS data transfer, the transmission of data will be paused in order that the paging sub-group can be read from the GSM CCCH.

Figure 3:
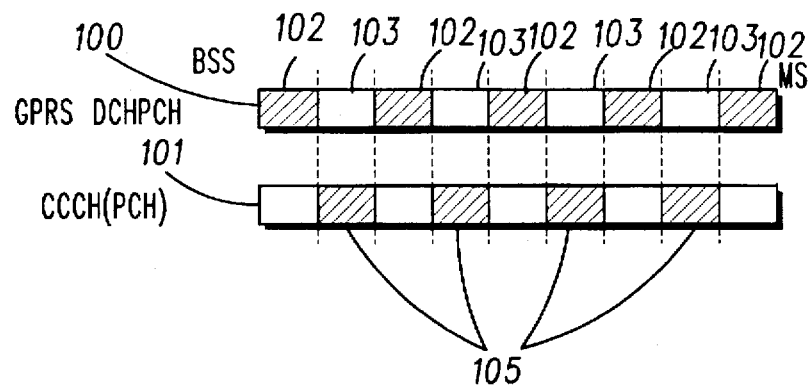
FIG. 3 is a timing diagram illustrating certain channels between a BSS and an MS during operation of a system in accordance with a second aspect of the invention with MT GPRS functions.

The general concept is shown in FIG. 3.

In FIG. 3, the GPRS data channel and paging channel 100 between a BSS and an MS is shown above and a call control channel and paging channel 101 is shown below.

The GPRS DCH/PCH 100 shows active time periods 102 and inactive time periods 103. The diagram is not to scale. The active time periods are much longer than the inactive time periods typically by a ratio of 1 second to a few milliseconds.

During the active time periods 102 the BSS and the MS exchange (i.e. transmit and receive) GPRS data. During the inactive time periods 103, the BSS and the MS stop transmitting and receiving GPRS data at times which correspond to the paging request periods 105 for the MS on the CCCH (PCH) 101 and during these periods, the BSS sends paging request on the CCCH (PCH) to a paging group. The MS listens to the paging group.

Outbound data packets are divided into four bursts per packet or block. The BSS buffers the data and schedules transmission of the bursts of data to the MS. The bursts are scheduled so that they do not co-incide with the MS's paging channel paging request periods (or slots) 105 as determined by the paging sub-group.

The BSS has knowledge of the paging sub-group from the last two (or more) digits of the IMSI of the destination MS. The IMSI is transferred from the SGSN to the BSS with a MAC packet or through link layer control. Alternatively the IMSI is sent outbound from the SGSN to the BSS with each user data packet. All packets for the ongoing data transfer are scheduled for transmission according to the pre-received (or included) IMSI.

Thus the MS will always be able to monitor the CCCH (PCH) and be logged on to GPRS.

This technique builds on existing paging sub-group knowledge already within the BSS and MS. The MSC/VLR is unaware of the contemporary GPRS state of the MS. The MSC/VLR issues a paging request as it requires. The SGSN is unaware of the MSC/VLR procedures. Functionality at the BSS and MS radio-interface controls the transmission of data. The data transmission control function is based on the Tx/Rx capabilities of the MS, and the user's calculated paging sub-groups.

Thus there has been described, in a radio system with data capability comprising a remote station 10 and a base station subsystem 11, a method of operation comprising, at the remote station, the steps of: monitoring a data channel 100 during first time periods 102 associated with a data group and monitoring a paging channel 101 during second time periods intermittent between the first time periods, the second time periods being associated with a voice group.

In the preferred embodiment the data channel is a data paging sub-channel on one carrier frequency and the paging channel is a paging subchannel on a different carrier frequency. The remote unit is a member of both the data group and the voice group. The data group and voice group identifiers for the remote unit are offset from one another, so that the time slots of the data paging channel (falling within time periods 102) of the data channel 100 and the time slots 103 of the paging channel 101 are offset in time.

Figure 4:
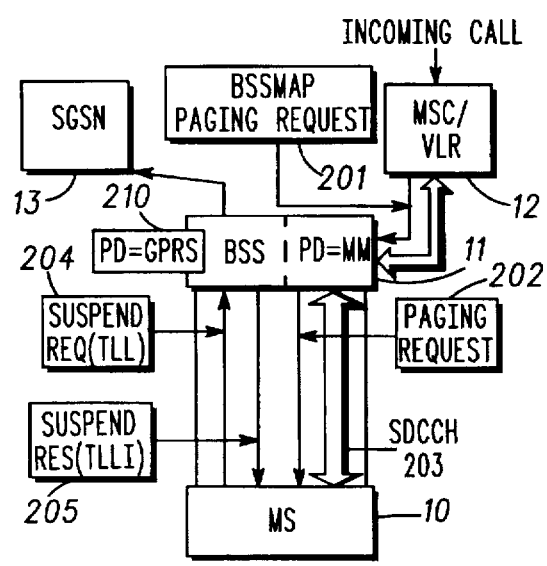
FIG. 4 is a block diagram illustrating further operation of the system in accordance with the second aspect of the invention.

When the MS captures a non-GPRS paging request the MS responds to the page as currently defined in phases 1 and 2. The MS sets up an SDCCH and executes MM procedures across it. It also manages the functionality associated with GPRS. A solution is shown in FIG. 4.

An incoming call causes the MSC to issue a BSSMAP paging request 201. The MSC is ignorant of the current state of the class B MS. The BSS issues a RR paging request 202. Upon capture of a paging request the MS immediately suspends operation of GPRS. Phases 1 and 2 call set-up functions are initiated, leading to the establishment of an SDCCH 203 for MM/CC procedures.

At a suitable point, e.g. after the authentication phase, the MS sends a suspend message 204 over the same SDCCH. The BSS routes this not to the MSC but to the SGSN based on the new protocol discriminator "GPRS" 210.

The subscriber's context in the SGSN is suspended 205. This may be acknowledged to the MS or unacknowledged. If the acknowledged step is omitted, implementation is easier.

The technical limitations of the radio-interface are unknown to the NSS. This offers a clean separation of the NSS and radio interface.

Non-GPRS paging requests are captured with the same probability as if the MS were executing idle mode procedures.

The standard functionality for paging and call establishment is adopted without modification. There is no additional delay in setting up a call. There are no impacts on the MSC or VLR, in terms of new functionality or modifications to data structures and there is no additional SS#7 traffic.

Some GPRS transmission capability will be lost. At a maximum, this will be equal to 4 to 8 bursts per paging group. A paging group occurs every 0.95 to 4.25 seconds, depending on CCCH configuration.

By definition, a class B MS operating GPRS must be able to receive paging requests with the same probability as if it were only operating idle mode procedures as defined in GSM 3.22. The above solution also allows reception of paging requests while a class B MS is sending or receiving data.

Thus in the second aspect of the invention, there has been described, in a radio system with data capability comprising a remote station 10, a base station subsystem 11 and a serving data service support node 13, a method of operation comprising the steps of: logging on to the system; establishing data service; exchanging data over a data channel 100 during first time periods 102 and stopping exchange of data over the data channel during second time periods 103 intermittent between the first time periods; during the second time periods, monitoring, at the remote station, paging requests communicated on a paging channel 101; identifying a non-data service paging request 202 on the paging channel; and responding to the non-data service paging request.

The method preferably comprises the steps of: establishing a stand-alone dedicated control channel 203 between the remote station and the base station subsystem; sending a suspend message from the remote station to the base station subsystem including a data service protocol discriminator 210; and routing the suspend message to the serving data service support node.

It has been described that, following the step of routing, data service is preferably suspended while remaining logged on to the system and that there is preferably acknowledgment from the serving data service support node to the remote station that data service is suspended.

A less preferred solution is one which will be referred to as a network subsystem solution.

In this solution, the MS will have to listen to the CCCH. If a GPRS-PCH exists separate from the CCCH, then the MS has to monitor both DRX paging sub-groups. An interesting problem occurs when MS is sending or receiving GPRS data and a MT call is initiated in the MSC/VLR. How is the paging request reliably received? There are two approaches proposed here: unreliable and reliable paging.

It can simply be accepted that when a class B MS is purchased, the subscriber accepts the limitation that the MS cannot reliably receive calls and send or receive data at the same time. This does not seem an unreasonable limitation considering that a class B MS is not seen as the top of the range model.

This approach is based on the high probability that few paging requests would be lost since, for the great majority of the time, the MS will not be sending or receiving data. Additionally, the majority of calls are MO and paging functionality is not involved.

The MSC/VLR pages the MS without regard to its existing GPRS state. If the paging request is not captured, the PLMN will repeat the paging request procedures as defined in phases 1 and 2 GSM.

In order to be in a known state on paging failures, before logging onto GPRS the Call Forwarding on not Reachable Supplementary Service is activated between the MS and the MSC/VLR. It is deactivated when logging off from GPRS. As before, this process is preferably hidden from the subscriber.

The MSC/VLR is not impacted by this solution.

Figure 5:
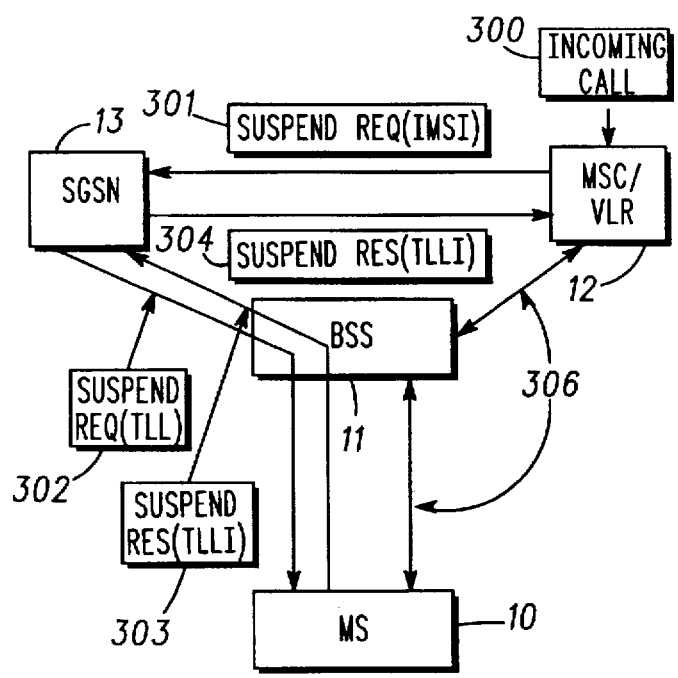
FIG. 5 is a block diagram illustrating alternative operation of the system in accordance with the second aspect of the invention.

An alternative solution which provides reliable paging while the MS is sending or receiving data is one which forces the MS to stop sending or receiving data and to listen to the CCCH as if it were executing idle mode procedures (GSM03.22). Upon an incoming call, the MSC signals to the SGSN to suspend GPRS for the given subscriber. The solution is illustrated in FIG. 5 and operates is as follows.

Upon an incoming call, the visited MSC/VLR checks to see if the subscriber has logged onto GPRS and if the subscriber has a class B MS.

If this is so, the MSC sends a suspend request (SUSPEND REQ) message 301 to the SGSN, using an IMSI as an unambiguous identity.

If the SGSN context associated with the IMSI is sending or receiving data, data transmission is stopped. The SGSN forces the MS to stop sending or transmitting data, i.e. enter the suspend sate. This means that the MS can only listen to the CCCH(PCH) and respond if non-GPRS paging requests are received or perform non-GPRS specific operations.

Once the SGSN has guaranteed that the MS is in a suspended state and will be listening to the CCCH(PCH)s, the SGSN returns a suspend resume (SUSPEND RES) message 304 to the MSC/VLR. The MSC/VLR then executes the standard paging procedure 306. No modification to the standard procedure is required.

One of many possible variations of this functionality is for the MSC to send the BSSMAP paging request to the SGSN. The SGSN then sends the corresponding RR paging request over the GPRS-PCH. However, this is less desirable since it would change core functionality.

Upon completion of all non-GPRS service requests, the MS can return to the idle mode (GSM 3.22). The MS then resumes GPRS operation. The required signalling is as follows. Upon completion of the non-GPRS service request, the MS will resume GPRS by sending a resume message to the SGSN. The MS and SGSN will then be able to move to active mode and transmit data if required.

What is claimed is:

1. In a radio system with data capability comprising a remote station, a base station subsystem, a mobile switching center and a serving data service support node, a method of operation comprising the steps of:

logging on to the radio system by the remote station;

establishing packet data service between the remote station and the serving data service support node;

suspending packet data service while remaining logged on to the radio system by sending a suspend service message from the mobile switching center to the serving data service support node; and signalling from the serving data service support node to the mobile switching center that packet data service is suspended.

2. A method according to claim 1, further comprising paging the remote station from the mobile switching center, for routing an incoming call from the mobile switching center to the remote station while the data service is suspended.

3. In a radio system with data capability comprising a remote station, a base station subsystem and a serving data service support node, a method of operation comprising the steps of:

logging on to the radio system;

establishing data service;

exchanging data over a data channel on a first frequency during first time periods and stopping exchange of data over the data channel during second time periods intermittent between the first time periods;

during the second time periods, monitoring, at the remote station, paging requests communicated on a paging channel on a second frequency;

identifying a non-data service paging request on the paging channel; and responding to the non-data service paging request.

4. A method according to claim 3 further comprising the steps of:

establishing a stand-alone dedicated control channel between the remote station and the base station subsystem;

sending a suspend message from the remote station to the base station subsystem including a data service protocol discriminator; and routing the suspend message to the serving data service support node.

5. A method according to claim 4, further comprising the steps of, following the step of routing:

suspending data service while remaining logged on to the radio system.

6. A method according to claim 5 further comprising the step of acknowledging from the serving data service support node to the remote station that data service is suspended.

7. In a GSM cellular radio system providing GPRS service and comprising a remote station, a base station subsystem, a mobile switching center and a serving GPRS support node, a method of operation comprising the steps of:

logging on to the GPRS service by the remote station;

establishing GPRS service between the remote station and the serving GPRS support node;

suspending GPRS service while remaining logged on to the GPRS service by sending a suspend service message from the mobile switching center to the serving GPRS support node; and signalling from the serving GPRS support node to the mobile switching center that GPRS service is suspended.

8. A method according to claim 7, further comprising the step of acknowledging from the serving GPRS support node to the remote station that GPRS service is suspended.

9. A method according to claim 7 wherein the step of signalling from the remote station to the serving GPRS support node comprises signalling an estimation of an expected period of duration of GPRS service suspension.

10. A method according to claim 7 further comprising the steps of:

initiating one of non-GPRS operation and non-service-specific operation;

sending a resume message from the remote station to the serving GPRS support node; and sending a response from the serving GPRS support node to the remote station.

11. In a GSM cellular radio system providing GPRS service and comprising a remote station, a base station subsystem and a serving GPRS support node, a method of operation comprising the steps of:

logging on to the GPRS service;

establishing GPRS service;

exchanging data over a GPRS data channel on a first frequency during first time periods and stopping exchange of data over the GPRS data channel during second time periods intermittent between the first time periods;

during the second time periods, monitoring, at the remote station, paging requests communicated on a non-GPRS paging channel on a second frequency;

identifying a non-GPRS service paging request on the non-GPRS paging channel; and responding to the non-GPRS service paging request.

12. A method according to claim 11 further comprising the steps of:

establishing a stand-alone dedicated control channel between the remote station and the base station subsystem;

sending a suspend message from the remote station to the base station subsystem including a GPRS service protocol discriminator; and routing the suspend message to the serving GPRS support node.

13. A method according to claim 12, further comprising the steps of, following the step of routing:

suspending GPRS service while remaining logged on to the GPRS service.

14. A method according to claim 13 further comprising the step of acknowledging from the serving GPRS support node to the remote station that GPRS service is suspended.

15. In a radio system with data capability comprising a remote station and a base station subsystem, a method of operation comprising, at the remote station, the steps of:

exchanging two-way packet data on a data channel on a first frequency during first time periods associated with a data group; and monitoring a paging channel on a second frequency during second time periods intermittent between the first time periods, the second time periods being associated with a voice group, for receipt of notification of an incoming circuit switched voice call.

* * * * *